(12) United States Patent
Roberts

(10) Patent No.: US 9,403,580 B2
(45) Date of Patent: Aug. 2, 2016

(54) VESSEL

(71) Applicant: SeaCaptaur IP PTY Ltd., Osborne Park, Western Australia (AU)

(72) Inventor: Alan Roberts, Osborne Park (AU)

(73) Assignee: SeaCaptaur IP Pty Ltd., Osborne Park, Western Australia (AU)

( * ) Notice: Subject to any disclaimer, the term of this patent is extended or adjusted under 35 U.S.C. 154(b) by 0 days.

(21) Appl. No.: 14/425,366

(22) PCT Filed: Aug. 29, 2013

(86) PCT No.: PCT/AU2013/000965
§ 371 (c)(1),
(2) Date: Mar. 3, 2015

(87) PCT Pub. No.: WO2014/032101
PCT Pub. Date: Mar. 6, 2014

(65) Prior Publication Data
US 2015/0251730 A1    Sep. 10, 2015

(30) Foreign Application Priority Data
Sep. 3, 2012 (AU) ................................ 2012903825

(51) Int. Cl.
*B63B 21/16* (2006.01)
*B63H 25/42* (2006.01)
(Continued)

(52) U.S. Cl.
CPC ................. *B63B 21/16* (2013.01); *B63B 27/14* (2013.01); *B63B 27/32* (2013.01); *B63B 27/34* (2013.01);
(Continued)

(58) Field of Classification Search
CPC .................................................... B63B 22/021
USPC ........ 441/4; 114/258; 701/116; 405/158, 168
See application file for complete search history.

(56) References Cited

U.S. PATENT DOCUMENTS 4,205,379 A * 5/1980 Fox ...................... E21B 41/0014
114/144 B
4,273,066 A * 6/1981 Anderson ................. F16L 3/01
114/230.13
(Continued)

FOREIGN PATENT DOCUMENTS

GB      1 309 933           3/1973
GB      1309933 A *     3/1973     .............. E21B 7/128
(Continued)

OTHER PUBLICATIONS

International Search Report for International Application No. PCT/AU2013/000965 mailed Jan. 2, 2014 (7 pages).
(Continued)

*Primary Examiner* — Lars A Olson
*Assistant Examiner* — Jovon Hayes
(74) *Attorney, Agent, or Firm* — Merchant & Gould P.C.

(57) ABSTRACT

A vessel generally in the form of a tanker or tank barge, the vessel having means for dynamically positioning thereof, to allow the vessel to approach an offshore facility, and deploy a gangway to it, allowing crew to transfer onto the facility, thereby making crew available to a normally unmanned facility. There is also provided a vessel comprising a hull having a bottom section adapted to be received by the surface of a body of water, the bottom section comprising at least one first and second helical propellers, the first helical propellers located adjacent the bow of hull and the second helical propellers located adjacent the stern of the hull. Moreover, there is provided a hose spooling device wherein the device is adapted to be connected to the facility for loading or unloading of hydrocarbons through paying out a hose over or near to the bow of the vessel.

9 Claims, 2 Drawing Sheets

(51) Int. Cl.
  *G05D 1/02* (2006.01)
  *B63B 27/14* (2006.01)
  *B63B 27/32* (2006.01)
  *B63B 35/00* (2006.01)
  *B63B 39/08* (2006.01)
  *B63H 1/04* (2006.01)
  *B63H 25/04* (2006.01)
  *B65H 75/44* (2006.01)
  *B63B 27/34* (2006.01)
  *B63H 5/02* (2006.01)

(52) U.S. Cl.
  CPC .............. *B63B 35/003* (2013.01); *B63B 39/08* (2013.01); *B63H 1/04* (2013.01); *B63H 25/04* (2013.01); *B63H 25/42* (2013.01); *B65H 75/4481* (2013.01); *G05D 1/0206* (2013.01); *B63B 2027/141* (2013.01); *B63H 2005/025* (2013.01); *B63H 2025/045* (2013.01)

(56) References Cited

U.S. PATENT DOCUMENTS

| | | | | |
|---|---|---|---|---|
| 5,803,779 A * | 9/1998 | Horton, III | ............ | B63B 22/021 114/230.23 |
| 6,485,343 B1 * | 11/2002 | Børseth | ................ | B63B 22/021 114/258 |
| 6,976,443 B2 * | 12/2005 | Oma | ....................... | B63B 27/24 114/144 B |
| 8,028,638 B2 * | 10/2011 | Olsen | ..................... | B63B 22/02 114/242 |
| 8,286,678 B2 * | 10/2012 | Adkins | ................. | B63B 22/026 114/230.15 |
| 8,622,099 B2 * | 1/2014 | Liem | ....................... | B63B 27/24 141/382 |
| 2008/0242165 A1 * | 10/2008 | Adkins | ................. | B63B 22/021 441/4 |
| 2010/0226723 A1 * | 9/2010 | Chouest | ................... | B63B 27/24 405/158 |
| 2012/0204363 A1 * | 8/2012 | Westermark | .......... | B63B 27/143 14/71.3 |
| 2013/0228110 A1 * | 9/2013 | Rohden | ................... | B63B 27/14 114/39.3 |

FOREIGN PATENT DOCUMENTS

| | | | | |
|---|---|---|---|---|
| GB | 1492654 A | * | 11/1977 | ........... G05D 1/0208 |
| GB | 1 492 654 | | 11/1997 | |
| WO | WO 02/20343 | | 3/2002 | |

OTHER PUBLICATIONS

First International Written Opinion for International Application No. PCT/AU2013/000965 mailed Jan. 2, 2014 (9 pages).

Second International Written Opinion for International Application No. PCT/AU2013/000965 mailed Oct. 17, 2014 (9 pages).

* cited by examiner

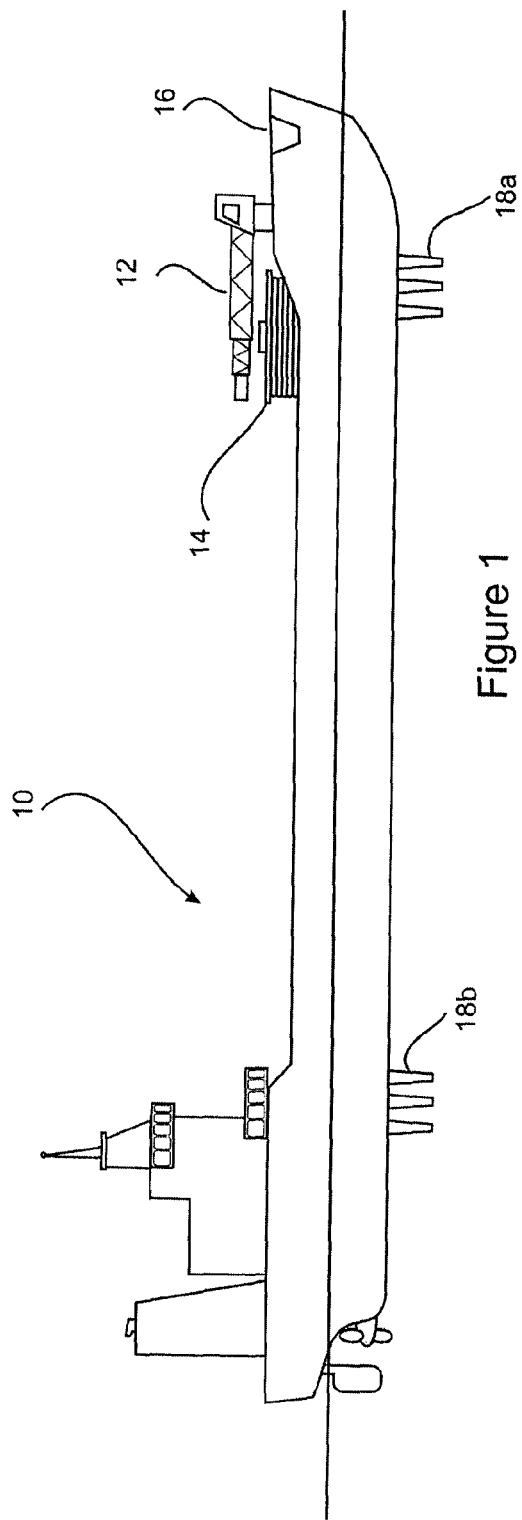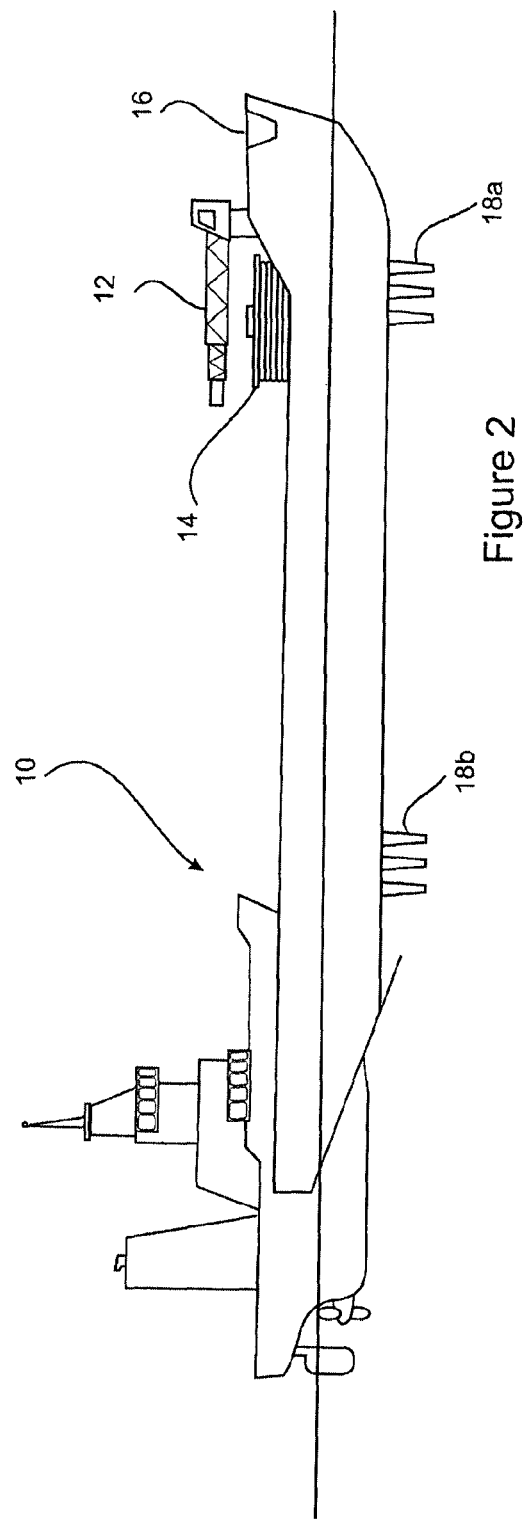

VESSEL

This application is a National Stage Application of PCT/AU2013/000965, filed 29 Aug. 2013, which claims benefit of Ser. No. 2012903825, filed 3 Sep. 2012 in Australia and which applications are incorporated herein by reference. To the extent Appropriate, a claim of priority is made to each of the above disclosed applications.

TECHNICAL FIELD

The present invention relates to the loading and unloading of hydrocarbon liquids, to or from vessels, to or from facilities located in or on the sea, where the host facility is normally unmanned and there is also need for the vessel crew to transfer to an from the facility by gangway.

The invention has been devised particularly, although not necessarily solely, in relation to loading and unloading and transporting hydrocarbon liquids to or from facilities located in or on the sea.

BACKGROUND ART

The following discussion of the background art is intended to facilitate an understanding of the present invention only. The discussion is not an acknowledgement or admission that any of the material referred to is or was part of the common general knowledge as at the priority date of the application.

Typically, to load or offload hydrocarbon liquids to or from a facility in on the sea, the transporting vessel is usually a tanker, or less commonly a tank barge. A tank barge being a towed or pushed unmanned barge.

Typically, to load or offload hydrocarbon liquids to or from an offshore facility, the transporting vessel requires to moor to the host facility, or is dependent upon a dedicated nearby mooring, connected to the host facility, by surface hose or subsea pipeline.

Typically, to load or offload hydrocarbon liquids to or from an offshore facility, transporting vessel plays no role in, the operation of the facility.

Often, the transporting vessel requires additional assistance in the form of line handing boats and tugs to connect to the moorings, and to manage the loading connection of the hoses.

There is generally no physical connection in the form of gangway or means to personnel transfer between facility and the transporting vessel.

Modern methods of control and communications available, now enable certain types of facilities, to be normally unmanned.

Modern methods of vessel propulsion and position control, now enable certain types of vessels to connect up to offshore facilities, without physically mooring to the facility, or to the seabed. These vessels are referred to as dynamically positioned.

It is against this background that the present invention has been developed.

SUMMARY OF INVENTION

According to a first aspect of the invention there is provided a vessel generally in the form of a tanker or tank barge, which is dynamically positioned, so as to allow the vessel to approach an offshore facility, and deploy a gangway to it, allowing crew to transfer onto the facility, thereby making crew available to a normally unmanned facility, to assist in any operation which might be contemplated thereafter.

Preferably, the vessel is fitted with all of the control system to allow the vessel to remotely control the equipment and machinery on the facility, to allow unmanned operation, loading and unloading.

Preferably, the vessel dynamic propulsion system comprises helical propellers, which have inherently superior dynamic excursion envelope, and can also provide roll stabilization, providing safer and effective vessel movement characteristics when connected to the facility.

Preferably, the vessel, comprises a bow mounted telescopic dynamically active gangway, so to compensate for movements of the vessel relative to the facility.

Preferably, the vessel comprises a series of position control systems based upon subsea acoustic, fan beam, taunt wire, satellite global positioning technologies, which are integrated with the propulsion system to provide real time position control.

Preferably, the vessel further comprises a loading or unloading hose spooling devise, which is able to be connected to the facility to loading or unloading of hydrocarbons by paying out a hose over or near to the bow of the vessel.

Preferably, the loading/unloading spooling devise is a dynamic devise such that the vessel may move safely clear of the facility and continue to load/unloading hydrocarbons, which the spooling devise automatically correcting the available hose length in accordance with changes in position of the vessel.

According to a third aspect of the invention there is provided a vessel comprising a hull having a bottom section adapted to be received by the surface of a body of water, the bottom section comprising at least one first and second helical propellers, the first helical propellers located adjacent the bow of hull and the second helical propellers located adjacent the stern of the hull According to a fourth aspect of the invention there is provided a loading or unloading hose spooling devise, which is able to be connected to the facility to loading or unloading of hydrocarbons by paying out a hose over or near to the bow of the vessel.

Preferably, the loading/unloading spooling devise is a dynamic devise such that the vessel may move safely clear of the facility and continue to load/unloading hydrocarbons, which the spooling devise automatically correcting the available hose length in accordance with changes in position of the vessel.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 1 is a schematic side view of a tanker, in accordance with a first embodiment of the invention; and FIG. 2 is a schematic side view of an ocean going tank barge, with pusher tug secured by articulated connection in accordance with a second embodiment of the invention.

DESCRIPTION OF EMBODIMENTS

Figure 3:
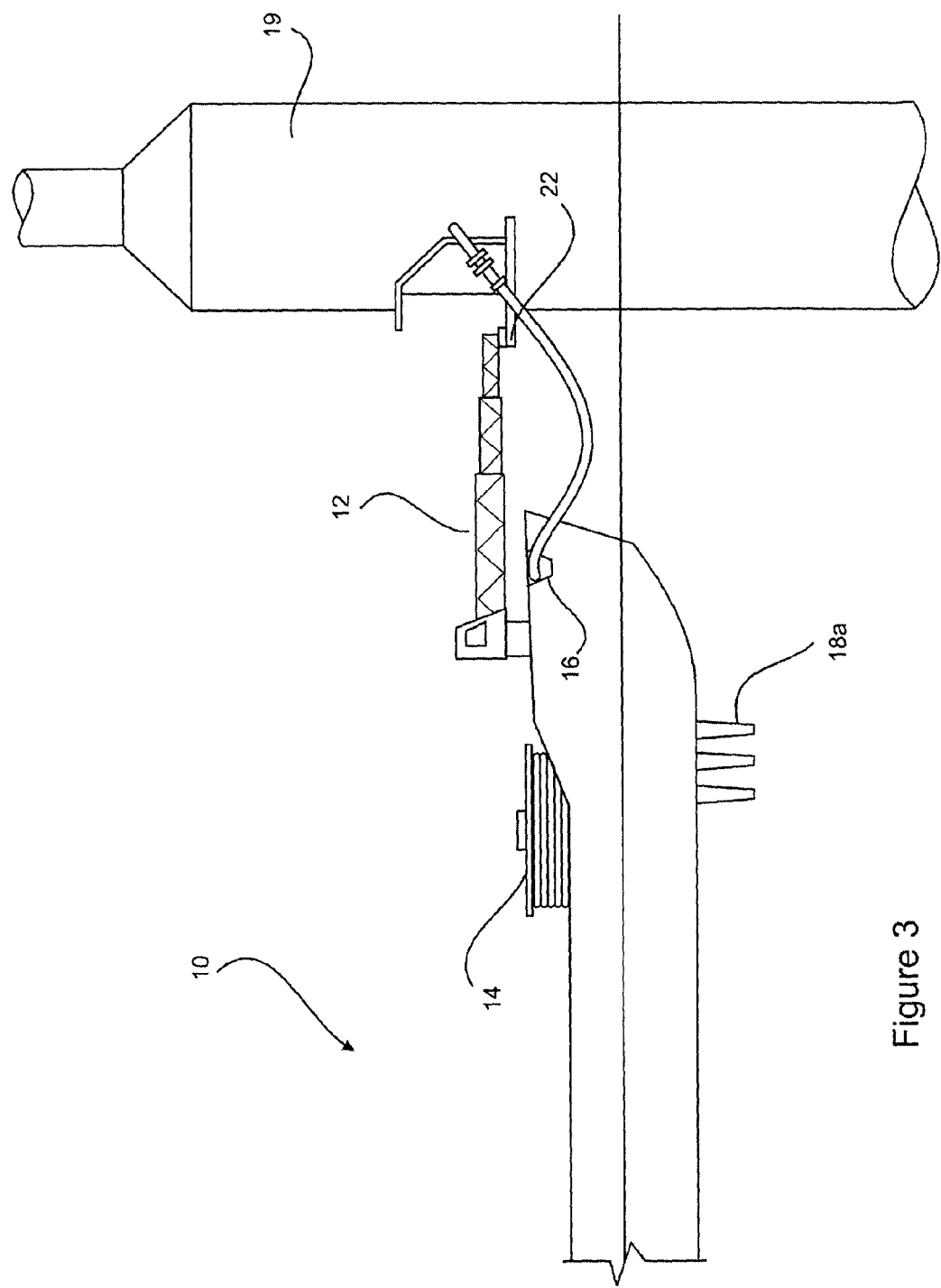
FIG. 3 is a schematic side view of a vessel, such as a tanker or a tank barge, connected to an offshore facility, gangway and loading hose.

FIG. 1 shows a tanker, FIG. 2 shows a vessel such as, for example, a tank barge 10 with pusher tug, both of which comprise a bow mounted telescopic gangway 12 (depicted in the stowed position), a loading hose spooling devise 14, and a removable element in the prow 16.

The tank barge 10 comprises thrust means to provide direction control to the tank barge 10. In the arrangement shown in the figures, the thrust means comprise at least one helical propellers 18 for altering the direction of the tank barge 10. In a particular arrangement, there are a plurality of helical propellers 18, a first helical propellers 18a located adjacent the bow of the hull of the tank barge 10 and a second helical propellers 18b is adjacent the stern of the tank barge 10. The helical propellers 18 act as azimuthal thrusters which allow the tank barge 10 to be dynamically positioned. Also, the helical propellers 18 assist in motion damping which enhances operability of the tank barge 10 during delivery of the cargo (located inside the tank barge 10) as well as during retrieval of the hydrocarbons. Moreover, the helical propellers 18 also contribute to the propulsion of the tank barge 10. Thus, increasing the speed of the tank barge during delivery and return voyages. The tug power of the tank barge 10 is also increased because of the presence of the helical propellers 18.

FIGS. 1 and 2 show a particular arrangement of a tank barge 10 in accordance with the present embodiment of the invention. The depicted tank barge 10 are shown to comprise with helical propellers 18, located bow and stern, to provide omni directional positioning ability. Helical propellers 18 are more commonly known as Voith Schneider propellers. These propellers 18 have superior reaction response times to other type of propellers. Additionally, these propellers 18 are able function as roll stabilizers, and to provide propulsion assist when the vessel is undertaking a voyage.

FIG. 3 depicts the bow of a tank barge 10 connected to an offshore structure 19. The tank barge 10 is attached to the offshore facility 19 by means of the bow mounted telescopic gangway 12. A loading hose 22 for hydrocarbon liquids transfer is included. The loading hose 22 is deployed through the prow 16 of the tank barge 10 allowing hydrocarbon or other liquids to be pumped to or from the tank barge 10. The crew of the tank barge 10 may access the offshore facility 19 by means of the gangway 12 to fluidly attach the loading hose 22 to the offshore facility 19. Once the loading hose 22 is connected, the gangway 12, may be withdrawn. At this stage, the tank barge 10 may be moved to a location further off from the offshore facility 19 thereby reducing risk of accidental contact between the vessel and offshore facility 19. The process of loading or unloading through the hose 22 continues in view that the hose 22 is still fluidly connected to the offshore facility 19. These is provided a spooling devise 14 which allows storage of the hose 22 as well as retrieval of the hose 22 for connection to the offshore facility 19. It is particularly advantageous that the house 22 is delivered via a spooling device 14 because the length of the hose 22 can be adjusted as the location of the tank 22 changes during loading and unloading of hydrocarbons. The spooling devise 14 operates in a constant tension mode.

In a particular arrangement, the loading/unloading spooling devise 14 is a dynamic devise allowing the tank barge 10 to move away or towards the offshore facility 19 during the loading or unloading of the hydrocarbons. Thus, the spooling devise 14 automatically corrects the length of the hose 22 in accordance with changes in the position of the vessel.

It is evident that the present system is particularly advantageous for offloading of hydrocarbons obtained from remote offshore fields, in particular marginal production site. The reason for this is the mooring and subsea interconnecting infrastructure cost is significantly less than that of a SPM (single point mooring systems), which would be otherwise employed. Further, no other assisting vessels are required.

Modifications and variations as would be apparent to a skilled addressee are deemed to be within the scope of the present invention.

Further, it should be appreciated that the scope of the invention is not limited to the scope of the embodiments disclosed. For example the same embodiments might be applied to a small tanker.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A vessel for connection to an unmanned facility, the vessel comprising a dynamic propulsion system and a loading or unloading hose spooling device, the hose spooling device being connected to the unmanned facility for loading or unloading of hydrocarbons by paying out a hose over or near to a bow of the vessel, and the vessel is fitted with control systems to allow the vessel to remotely control the equipment and machinery on the unmanned facility, to allow operation and loading and unloading between the vessel and the unmanned facility; wherein the dynamic propulsion system comprises helical propellers for providing to the vessel dynamic excursion envelope and roll stabilization.

2. A vessel according to claim 1 wherein the vessel comprises a bow mounted telescopic dynamically active gangway to compensate for movements of the vessel relative to the unmanned facility.

3. A vessel according to claim 1 wherein the vessel comprises a plurality of position control systems based upon subsea acoustic referencing, fan beam, taunt wire, satellite global positioning technologies.

4. A vessel according to claim 3 wherein the plurality of position control systems are integrated with the dynamic propulsion system to provide real time position control and station keeping relative to the facility.

5. A vessel according to claim 1 wherein the loading or unloading spooling device is a dynamic device, the hose spooling device being adapted to automatically wind in or pay out the hose to adjust the length of a section of the hose located between the vessel and the unmanned facility in accordance with changes in position of the vessel relative to the unmanned facility.

6. A vessel according to claim 1 comprising a hull having a bottom section adapted to be received by the surface of a body of water, the bottom section comprising at least one first helical propeller and at least one second helical propeller, the first helical propeller located adjacent the bow of hull and the second helical propeller located adjacent the stern of the hull.

7. A hose spooling device for mounting on a vessel for storage of a hose adapted to allow fluid transfer between the vessel and an unmanned facility, the hose spooling device being adapted to automatically wind in or pay out the hose to adjust the length of a section of the hose located between the vessel and the unmanned facility in accordance with changes in position of the vessel relative to the unmanned facility.

8. A hose spooling device in accordance with claim 7 wherein the hose spooling device is adapted to be connected to the facility for loading or unloading of hydrocarbons through paying out a hose over or near to the bow of the vessel.

9. A vessel for connection to an unmanned facility, the vessel comprising a hose spooling device for storage of a hose adapted to allow fluid transfer between the vessel and the unmanned facility, the hose spooling device being adapted to automatically wind in or pay out the hose to adjust the length of a section of the hose located between the vessel and the unmanned facility in accordance with changes in position of the vessel relative to the unmanned facility.

\* \* \* \* \*